Patented May 9, 1944

2,348,320

UNITED STATES PATENT OFFICE 2,348,320

SALT WATER PIT LINING

Joseph C. Becker, Longview, Tex., assignor to The Atlantic Refining Company, Philadelphia, Pa., a corporation of Pennsylvania No Drawing. Application July 3, 1942,
Serial No. 449,697

4 Claims. (Cl. 94—20)

The present invention relates to improvements in pits for the collection or storage of salt water, and relates more particularly to the provision of a pit lining composition resistant to the action of salt water, such composition being resilient, waterproof, and stable against deterioration by weathering.

In many crude oil producing areas, it has been found that a considerable volume of salt water issues from the wells together with the oil. The salt water is settled out and separated from the oil in a separator or treating tank, and must be disposed of in the most convenient and economical manner. Usually this is accomplished either by allowing the water to accumulate in pits and then draining the pits into adjacent streams or rivers during periods of heavy rain or high water, or by injecting the water from the pits into disposal wells which are drilled and equipped for the express purpose of handling salt water. Occasionally the water is disposed of simply by permitting it to evaporate from large storage pits or reservoirs.

It has been the practice in many instances to construct salt water pits of concrete, and while such pits are satisfactory, the cost of construction is high and in most cases, uneconomical.

I have found that very satisfactory salt water pits may be constructed rapidly and with minimum cost by utilizing a resilient pit lining comprising an intimate mixture of bitumen, earth or top soil, and sawdust. More specifically, my composition comprises from 10% to 30% by weight of bitumen, such as petroleum asphalt, 50% to 70% by weight of top soil, and 30% to 70% by weight of sawdust. The proportions of these ingredients may be varied within the ranges given, depending upon the resiliency or plasticity desired, as well as upon the nature of the soil and bitumen employed. Furthermore, depending upon the bitumen content, the lining composition may of itself be waterproof, or may require a seal coat of bitumen to render the lining waterproof. For example, a composition which is waterproof and which requires no seal coat may comprise approximately 66 lbs. of top soil or earth, 12 lbs. of sawdust, and 22 lbs. of petroleum asphalt (as asphalt emulsion). On the other hand, a composition which is not absolutely waterproof, but which will not crack or buckle and which will readily lend itself to the application and retention of a seal coat, may comprise approximately 71 lbs. of top soil, 13 lbs. of sawdust, and 16 lbs. of asphalt (as asphalt emulsion). Of the two compositions given by way of example, the one requiring a seal coat is preferred, since experience has shown it to be most satisfactory and economical both from a standpoint of cost of materials, cost of applying, and general all-around efficiency.

In the construction of a salt water storage pit, the pit is excavated and side walls of desired height and slope are thrown up and may be compacted or permitted to settle under the influence of weather conditions. A lining composition is then made up by intimately mixing the soil, sawdust, and asphalt in the proportions, for example, 71 lbs. of soil, 13 lbs. of sawdust, and 16 lbs. of asphalt. The asphalt is preferably supplied in the form of an asphalt emulsion, although asphalt in the form of a cut-back (asphalt-naphtha mixture) may be used. Since the soil and the sawdust are usually damp, it has been found that the aqueous asphalt emulsion gives the most satisfactory results. The lining composition, in a plastic state, is then applied to the pit in such a manner as to provide a continuous sheet or layer over the pit bottom and side walls, such layer being of the order of 1½ to 2 inches in thickness. The pit lining is then permitted to dry and "set," and a seal coat of asphalt emulsion is then applied to the surface of the lining to render it waterproof. While it is preferred to employ petroleum asphalt as the bonding and waterproofing agent in the construction of the pit lining, other bitumens such as coal tar pitch, natural asphalt, and the like may also be utilized.

Pit linings produced in accordance with my invention have been found highly satisfactory for the collection and storage of salt water, and are not subject to cracking, buckling, or leakage under the conditions normally encountered in use.

I claim:

1. A composition suitable for lining salt water pits, comprising an intimate mixture of 10% to 30% by weight of bitumen, 50% to 70% by weight of soil, and 30% to 70% by weight of sawdust.

2. A composition suitable for lining salt water pits, comprising an intimate mixture of 10% to 30% by weight of petroleum asphalt, 50% to 70% by weight of soil, and 30% to 70% by weight of sawdust.

3. A composition suitable for lining salt water pits, comprising an intimate mixture of 22% by weight of petroleum asphalt, 66% by weight of soil, and 12% by weight of sawdust.

4. A lining suitable for salt water pits which includes an underlayer comprising an intimate mixture of 16% by weight of petroleum asphalt, 71% by weight of soil, and 13% by weight of sawdust, and a seal coat of petroleum asphalt.

JOSEPH C. BECKER.